US 6,597,845 B2

(12) United States Patent
Sun et al.

(10) Patent No.: US 6,597,845 B2
(45) Date of Patent: Jul. 22, 2003

(54) METHOD AND APPARATUS OF CROSS-CONNECTING OPTICAL FIBERS WITH LAYERED SUBSTRATES FORMING FIBER OPTIC RIBBONS

(75) Inventors: Maurice X. Sun, Westmont, IL (US); Sammy Ali, Lisle, IL (US); Igor Grois, Northbrook, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/045,876

(22) Filed: Nov. 7, 2001

(65) Prior Publication Data

US 2003/0086656 A1 May 8, 2003

(51) Int. Cl.[7] ................................................. G02B 6/44
(52) U.S. Cl. ............................. 385/114; 385/54; 385/55
(58) Field of Search ............................. 385/53, 54, 56, 385/59, 114, 134, 100, 115, 63, 65, 135

(56) References Cited

U.S. PATENT DOCUMENTS

| | | | | |
|---|---|---|---|---|
| 4,832,436 A | * | 5/1989 | Goto et al. ................... | 385/53 |
| 5,020,871 A | * | 6/1991 | Nishimura ................... | 359/147 |
| 5,278,933 A | * | 1/1994 | Hunsinger et al. .......... | 206/316.1 |
| 5,481,639 A | * | 1/1996 | Cobb et al. .................. | 385/135 |
| 5,519,804 A | * | 5/1996 | Burek et al. ................. | 385/134 |
| 6,327,414 B1 | * | 12/2001 | Strause et al. ............... | 385/134 |
| 6,351,590 B1 | * | 2/2002 | Shahid ........................ | 385/134 |

* cited by examiner

Primary Examiner—John D. Lee
Assistant Examiner—Daniel Valencia
(74) Attorney, Agent, or Firm—A. A. Tirva

(57) ABSTRACT

A method is provided for cross-connecting individual optical fibers of a plurality of fiber optic ribbons and includes the steps of providing first and second substrates having adhesive thereon. Individual optical fibers are routed on the substrates to form at least portions of fiber optic input ribbons and fiber optic output ribbons, with the fibers extending beyond the substrates to define input and output tails. One substrate is positioned on top of another substrate, and a ribbonizing apparatus is used to gather the input and output tails in ribbon form whereupon they can be coated to hold the tails in their ribbon form.

12 Claims, 6 Drawing Sheets

METHOD AND APPARATUS OF CROSS-CONNECTING OPTICAL FIBERS WITH LAYERED SUBSTRATES FORMING FIBER OPTIC RIBBONS

FIELD OF THE INVENTION

This invention generally relates to the art of optical fibers and, particularly, to a method of cross-connecting or reorganizing the individual optical fibers of a plurality of fiber optic ribbons and an apparatus for facilitating ribbonizing the individual fibers.

BACKGROUND OF THE INVENTION

Fiber optic circuitry is increasingly being used in electronics systems where circuit density is ever-increasing and is difficult to provide with known electrically wired circuitry. An optical fiber circuit is formed by a plurality of optical fibers carried by a dielectric, and the ends of the fibers are interconnected to various forms of connectors or other optical transmission devices. A fiber optic circuit may range from a simple cable which includes a plurality of optical fibers surrounded by an outer cladding or tubular dielectric to a more sophisticated optical backplane or flat fiber optic circuit formed by a plurality of optical fibers mounted on a substrate in a given pattern or circuit geometry.

One type of optical fiber circuit is produced in a ribbonized configuration wherein a row of optical fibers are disposed in a side-by-side parallel array and coated with a matrix to hold the fibers in the ribbonized configuration. In the United States, a twelve-fiber ribbon or an eight-fiber ribbon have become common. In other foreign countries, the standard may range from as a low as four to as high as twenty-four fibers per ribbon. Multi-fiber ribbons and connectors have a wide range of applications in fiber optic communication systems. For instance, optical splitters, optical switches, routers, combiners and other systems have input fiber optic ribbons and output fiber optic ribbons.

With various applications such as those described above, the individual optical fibers of input fiber optic ribbons and output fiber optic ribbons are cross-connected or reorganized whereby the individual optical fibers of a single input ribbon may be separated and reorganized into multiple or different output ribbons. The individual optical fibers are cross-connected or reorganized in what has been called a "mixing zone" between the input and output ribbons.

Optical backplanes are fabricated in a variety of manners, ranging from laying the optical fibers on a substrate by hand to routing the optical fibers in a given pattern or circuit geometry onto the substrate by mechanized apparatus. The individual optical fibers are cross-connected or reorganized on the substrate between input and output ribbons projecting from input and output ends or edges of the substrate. Therefore, the above-mentioned "mixing zone" is provided by the substrate, itself.

When cross-connecting optical fibers on substrates of optical backplanes, problems often are encountered because of the space limitations of a given application. In other words, the size of the substrate may be limited, but it may be necessary in a given specification to have more individual optical fibers in the input and output ribbons than the limited sized substrate can handle. This is particularly true when fabricating the optical backplane by mechanized apparatus. For example, a routing apparatus with a routing head may require 4–5 mm both in front of and behind a first laid optical fiber for laying a second fiber over the top of the first fiber. This requires an amount of space or "real estate" on the substrate. Obviously, if a substrate has a limited size, only a limited number of individual optical fibers can be cross-connected or reorganized on the substrate, and this limited number of individual fibers may be insufficient to fabricate input and output ribbons to meet a particular specification. Consequently, it may be necessary to fabricate a layered backplane wherein one or more substrates (with their limited number of routed fibers) are stacked on top of another substrate (with its limited number of routed fibers), whereby the fibers of the stacked substrates are combined to form the specified input and output ribbons.

Heretofore, multi-layered backplanes or circuits have been fabricated by placing a bottom layer adhesive coated substrate on a base sheet of adhesive coated paper-like material on top of a flat table or other platform. Individual optical fibers are placed on the bottom layer substrate and base sheet, with the fibers projecting beyond edges of the substrate to form ribbon tails. A conformal coating is applied to the bottom layer substrate and fibers, and the coating is cured. A second or top layer substrate is placed on top of the bottom layer, and individual optical fibers again are placed on the top layer substrate with end portions of the fibers extending outwardly onto the base sheet to form ribbon tails. A conformal coating is applied to the top layer substrate and all of the ribbon tails, and the coating is cured. The layered substrate and ribbon tails then are peeled off of the base sheet, and the base sheet is discarded. Such methods or processes can only be made by hand and, typically, one operator follows the entire process from start to finish for consistency reasons. A double-layered backplane may take as long as a full 8-hour day to complete. In addition, hand routing or laying of the fibers is difficult for maintaining straight lines and uniform ribbon tails with the tiny individual optical fibers.

The present invention is directed to solving these various problems in a method of manufacturing a multi-layer backplane or optic circuit which is particularly applicable for mechanized fabrication and involves the use of a simple ribbonizing apparatus.

SUMMARY OF THE INVENTION

An object, therefore, of the invention is to provide a new and improved method of cross-connecting the individual optical fibers of a plurality of fiber optic ribbons to form a backplane or other flat optical circuit.

Another object of the invention is to provide a new ribbonizing apparatus for gathering a plurality of individual optical fibers into ribbon form.

In the exemplary embodiment of the invention, the method includes the steps of providing a first substrate having an adhesive thereon. A plurality of individual optical fibers are routed onto the substrate to form at least portions of a plurality of fiber optic input ribbons, reorganizing the fibers on the substrate and forming at least portions of a plurality of fiber optic output ribbons, with the fibers extending beyond input and output sides of the substrate to define input tails and output tails of the input ribbons and output ribbons, respectively. A second substrate is provided with an adhesive thereon. A plurality of individual optical fibers are routed onto the second substrate to form at least portions of a plurality of fiber optic input ribbons, reorganizing the fibers on the second substrate and forming at least portions of a plurality of fiber optic output ribbons, with the fibers extending beyond input and output sides of the second substrate to define input tails and output tails of the input ribbons and output ribbons, respectively.

The second substrate and the fibers routed thereon then is placed on top of the first substrate and the fibers routed thereon, such that the fibers of the two substrates combine to form complete input and output ribbons along with their respective input and output tails. A ribbonizing apparatus is used to gather the input and output tails into ribbon form. The gathered input and output tails are coated on the ribbonizing apparatus to hold the tails in ribbon form. The coated tails then are stripped from the ribbonizing apparatus.

In the preferred embodiment, the individual optical fibers are routed onto the substrates by a mechanical routing apparatus having a routing head. Preferably, a coating is applied over the fibers routed on the first and second substrates.

The ribbonizing apparatus includes a frame and a plurality of elongated ribbonizing plates. Each plate is configured for receiving a plurality of individual optical fibers and gathering the fibers into ribbon form. Means are provided for mounting at least some of the ribbonizing plates on the frame for lateral movement relative thereto to adjust the relative positions of the plates.

According to one aspect of the invention, each ribbonizing plate includes a shallow trough in a top face thereof. At least one end of the trough is open for laying the fibers thereinto. The frame includes a plurality of longitudinal frame components joined by a plurality of cross frame components on which the ribbonizing plates slidably rest.

According to another aspect of the invention, the mounting means includes at least one guide rod extending transversely through the ribbonizing plates and along which the ribbonizing plates are slidably movable. The frame includes a pair of longitudinal side frame components between which the rod extends. The frame also includes at least a cross frame component on which the ribbonizing plates slidably rest.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Referring to the drawings in greater detail, FIGS. 1–5 show somewhat schematically the steps in the method or process of the invention for fabricating a multi-layer backplane or optical circuit, and FIGS. 6–17 show the structure of a universal ribbonizing apparatus for use with the method of the invention. The method of fabricating a multi layer backplane or optical circuit, generally designated 20 (FIG. 5), first will be described.

Figure 1:
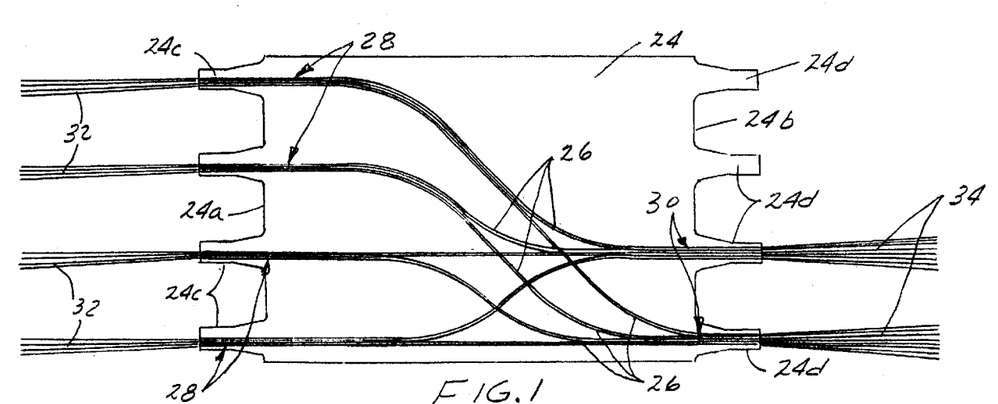
FIG. 1 is a top plan view showing the fabrication of the bottom layer circuit of the multi-layer backplane of the invention.

In particular, FIG. 1 shows the first steps in fabricating the backplane and involves the fabrication of a bottom layer circuit, generally designated 22. A first substrate 24 is provided with an adhesive coating on the top thereof. The substrate has an input side 24a and an output side 24b. A plurality of input fingers 24c project from input side 24a, and a plurality of output fingers 24d project from output side 24b. Bottom layer substrate 24 may be supported on a flat platform or other table-like support structure.

A plurality of individual optical fibers 26 then are routed, preferably by a mechanized apparatus, onto bottom layer substrate 24 to form at least portions of a plurality of fiber optic input ribbons, generally designated 28, with the fibers being reorganized on the substrate to form at least portions of a plurality of fiber optic output ribbons, generally designated 30. Although the reorganization can vary considerably, the circuit pattern illustrated herein involves four individual optical fibers from each input ribbon 28 being routed to one of a pair of output ribbons 30 to complete the composite of the output ribbons, whereby each output ribbon includes eight individual fibers. It can be seen that the fibers extend beyond input and output fingers 24c and 24d, respectively, at input and output sides 24a and 24b, respectively, of bottom layer substrate 24 to form input tails 32 and output tails 34 of loose optical fibers.

A conformal coating of plastic material then is applied over bottom layer substrate 24 and the individual fibers 26 routed thereon. The individual fibers in input tails 32 and output tails 34 remain loose.

Figure 2:
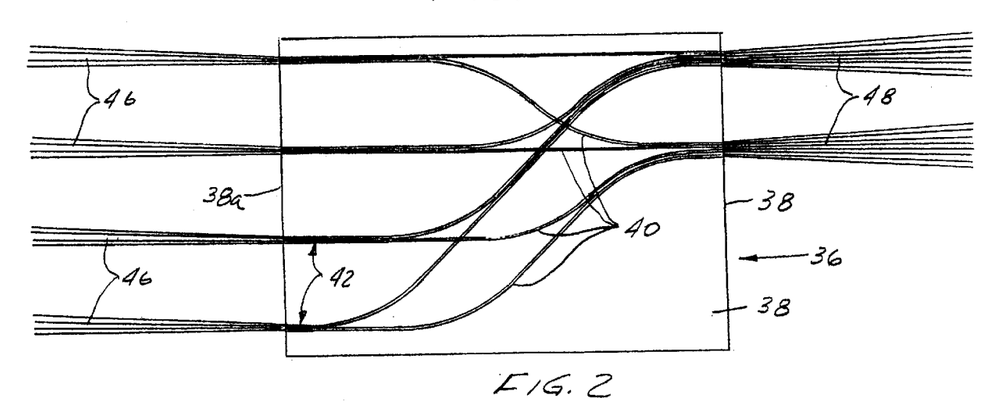
FIG. 2 is a top plan view of the top layer circuit of the multi-layer backplane.

A top layer circuit, generally designated 36, then is fabricated as seen in FIG. 2. The top layer circuit is similar to bottom layer circuit 22 in that it includes a top layer substrate 38 having an adhesive coating thereon. The top layer substrate includes an input side 38a and an output side 38b, but there are no input and output fingers such as input and output fingers 24c and 24d, respectively, of the bottom layer substrate shown in FIG. 1.

A plurality of individual optical fibers 40 then are routed, preferably by a mechanized apparatus, onto top layer substrate 38 to form at least portions of a plurality of input ribbons, generally designated 42, and a plurality of output ribbons, generally designated 44. The individual fibers extend beyond input side 38a and output side 38b of the top layer substrate to form input tails 46 and output tails 48 of loose individual fibers. A conformal coating of plastic material then is applied over top layer substrate 38 including the individual optical fibers 40 thereon, leaving the fibers in input tails 46 and output tails 48 loose.

Again without in any way limiting the considerable number of circuit patterns that can be routed on top layer substrate 38, two individual optical fibers 40 from each input ribbon 42 are routed to one of the output ribbons 44, so that each output ribbon is complete with eight individual fibers.

Figure 3:
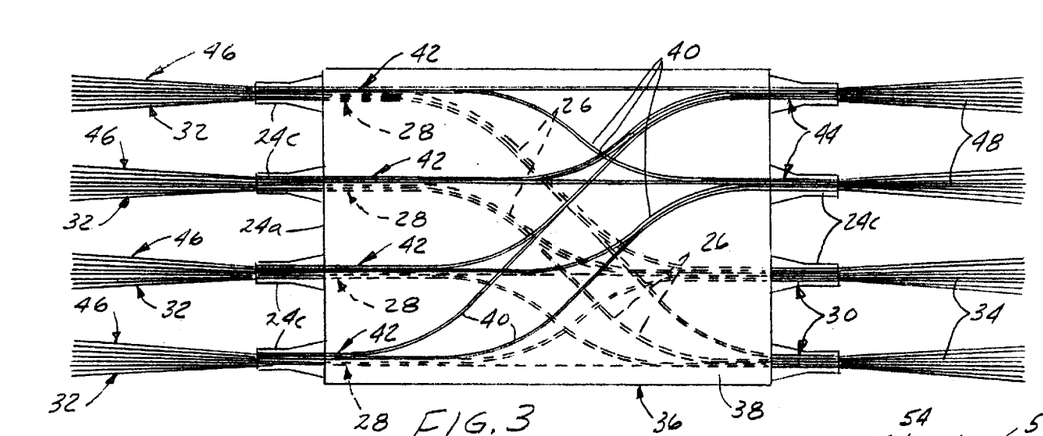
FIG. 3 is a top plan view showing the top layer circuit positioned on top of the bottom layer circuit.

Referring to FIG. 3, top layer circuit 36 then is placed on top of bottom layer circuit 22, with top layer substrate 38 overlying bottom layer substrate 24. The bottom layer substrate cannot be seen in FIG. 3 except for input fingers 24c and output fingers 24d of the bottom layer substrate.

When the top layer circuit is superimposed over the bottom layer circuit, it can be seen that input tails 32 of the bottom layer circuit lay alongside input tails 46 of the top layer circuit. With the individual fibers 26 of the bottom layer circuit being shown in phantom in FIG. 3, it can be seen that partial input ribbons 28 of the bottom layer circuit combine with partial input ribbons 42 of the top layer circuit to form complete input ribbons comprised of eight individual fibers corresponding to the eight fibers of each of the output ribbons 30 and 44. The end result is that there are four input ribbons of eight fibers and four output ribbons of eight fibers, with the individual fibers of the ribbons being cross-connected and reorganized on the substrates of the bottom and top layer circuits as shown by the full and phantom lines in FIG. 3. Finally, it can be seen that the individual fibers of partial input tails 32 and 46 and complete output tails 34 and 48 still remain loose in FIG. 3.

Figure 4:
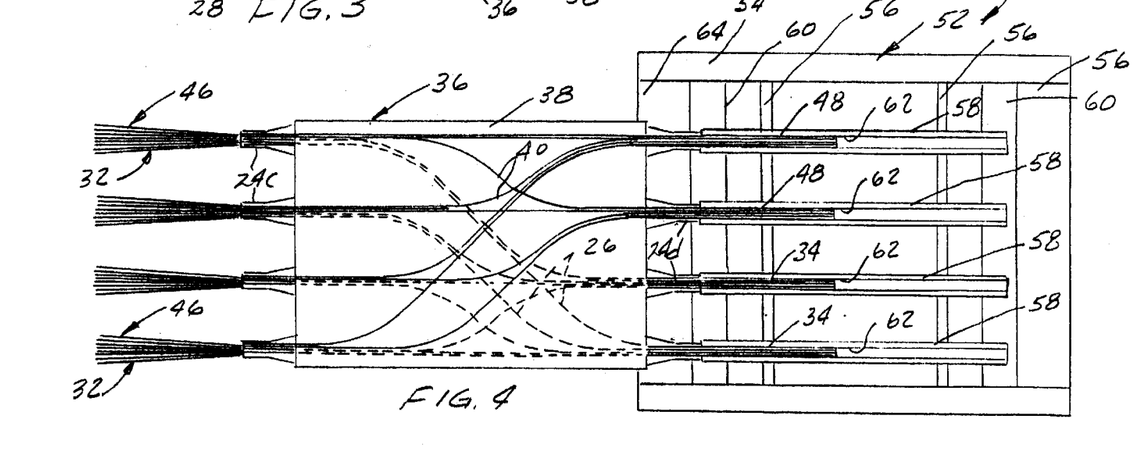
FIG. 4 is a view similar to that of FIG. 3, showing a ribbonizing apparatus for use in gathering and ribbonizing the fiber optic tails.
Figure 5:
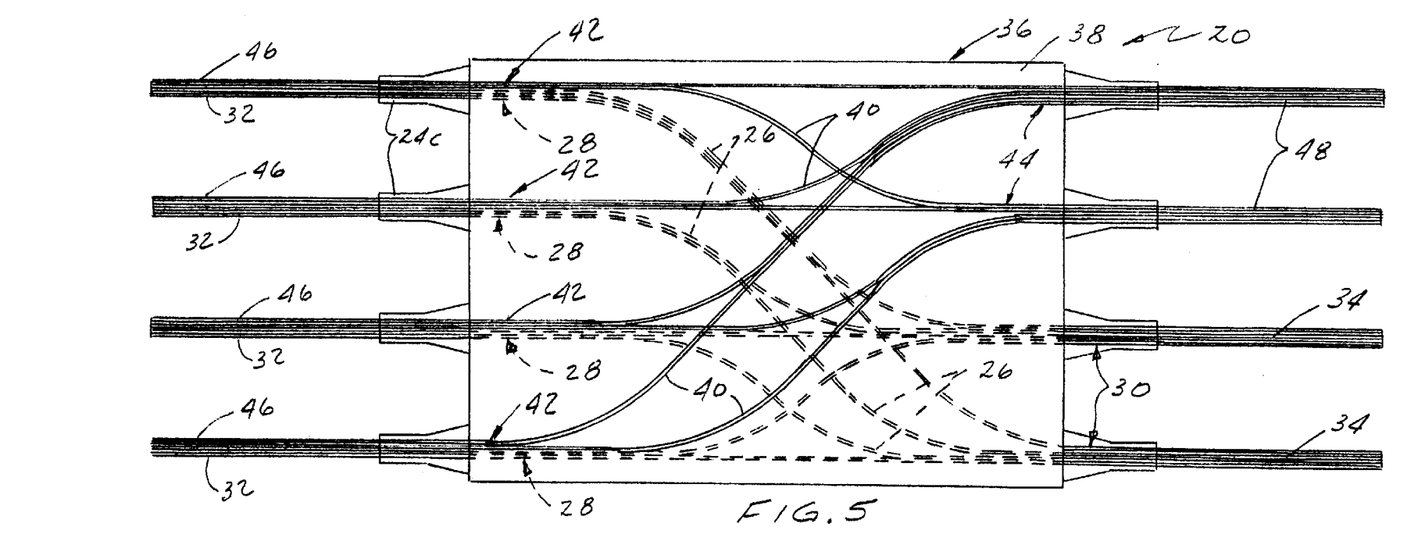
FIG. 5 is a top plan view of the final configuration of the multi-layer backplane or optical circuit.

FIG. 4 shows a ribbonizing apparatus, generally designated 50, which includes a frame, generally designated 52, formed by a pair of side frame components 54 joined by a plurality of cross frame components 56. A plurality of elongated ribbonizing plates 58 are adjustably mounted on a pair of guide rods 60 which extend through the ribbonizing plates. Each ribbonizing plate has a shallow trough 62 in the top surface of the plate.

FIG. 4 also shows the individual loose fibers of output tails 48 and 34 having been gathered and positioned into shallow troughs 62 of ribbonizing plates 58 so that the individual fibers are in a side-by-side flat or ribbon array. A conformal plastic coating then is applied over the ribbons after they are gathered in troughs 62. The coating is allowed to cure, whereupon the individual fibers of the ribbons are held in ribbon form. At least troughs 62 of ribbonizing plates 58 are coated with a release material, such as Teflon or the like, and the ribbonized output tails are easily stripped out of the troughs and away from ribbonizing apparatus 50.

Ribbonizing apparatus 50, or a second apparatus similar thereto, then is used to ribbonize the loose fibers of the input tails shown at the left-hand side of FIG. 4. The resulting product is a multi-layer backplane or optical circuit as shown at 20 in FIG. 5. In other words, top layer circuit 36 (FIG. 2) has been juxtaposed on top of bottom layer circuit 22 (FIG. 1) as described above in relation to FIG. 3. The loose fibers of the input and output tails then are ribbonized as described above in relation to FIG. 4, resulting in the final configuration of a multi-layer backplane or optical circuit 20 shown in FIG. 5.

Figure 6:
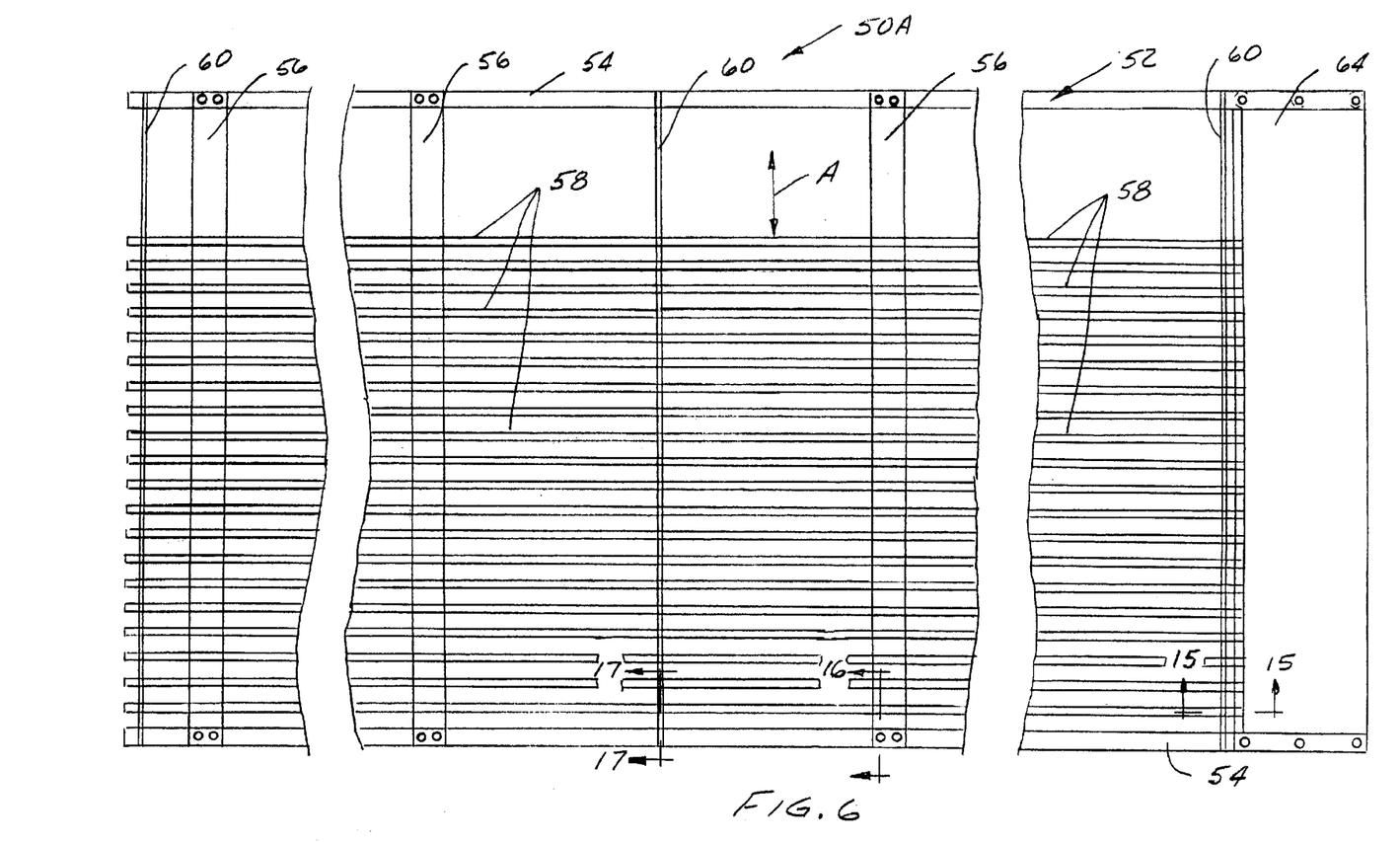
FIG. 6 is a top plan view of another embodiment of a universal ribbonizing apparatus.

FIG. 6 shows an alternate embodiment of a ribbonizing apparatus, generally designated 50A, which is similar to ribbonizing apparatus 52 shown in FIG. 4 and described above. Therefore, like numerals are applied in FIGS. 6–17 corresponding to like components described above and shown in FIG. 4.

More particularly, ribbonizing apparatus 50A (FIG. 6) includes a frame, generally designated 52, which includes a pair of side frame components 54 joined by a plurality of cross frame components 56 along with a front setup plate or platform 64. A plurality of elongated ribbonizing plates 58 are slidably or adjustably mounted on a plurality of guide rods 60 which extend between side frame components 54.

Figure 7:
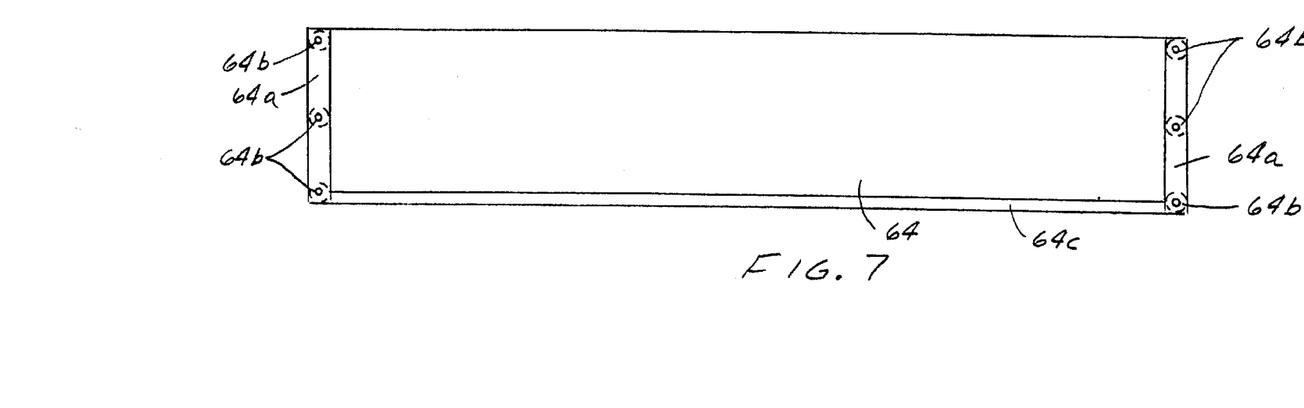
FIG. 7 is a top plan view of the setup plate of the apparatus of FIG. 6.
Figures 8, 9:
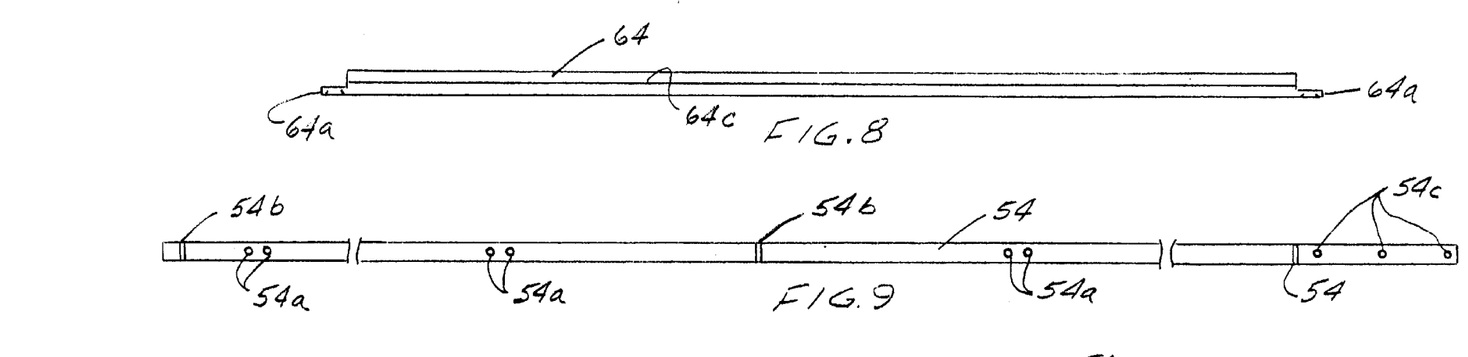
FIG. 8 is an edge elevational view of the setup plate of FIG. 7.
FIG. 9 is a top plan view of one of the side frame components of the apparatus of FIG. 6.

Setup plate 64 of ribbonizing apparatus 50A is shown in FIGS. 7 and 8. The setup plate includes opposite stepped sides 64a having through holes 64b.

One of the side frame components 54 is shown in FIG. 9. Each side frame component includes a plurality of vertical through holes 54a and a plurality of horizontal through holes 54b, along with a set of vertical holes 54c.

Figures 10, 11:
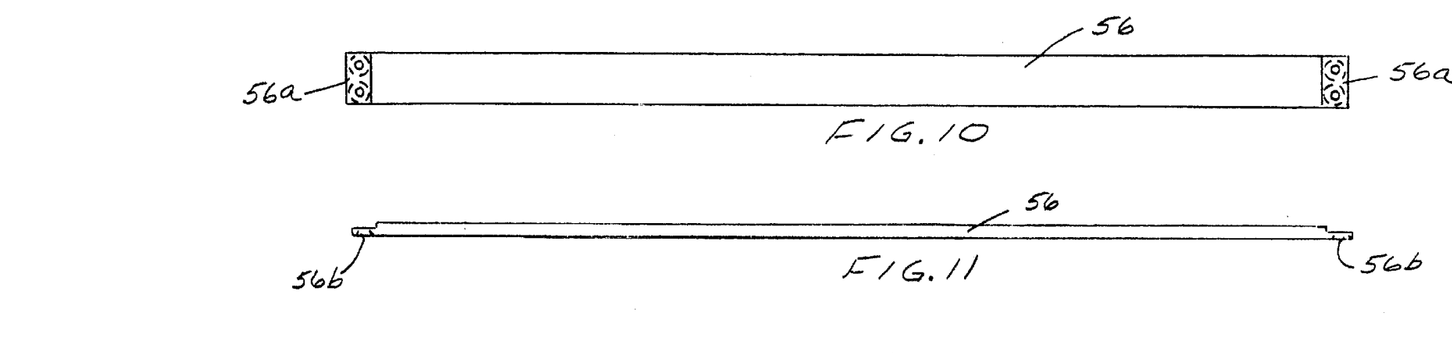
FIG. 10 is a top plan view of one of the cross frame components of the apparatus of FIG. 6.
FIG. 11 is an edge elevational view of the cross frame component of FIG. 10.

One of the cross frame components 56 is shown in FIGS. 10 and 11. Each cross frame component includes opposite stepped ends 56a having through holes 56b.

Figure 12:
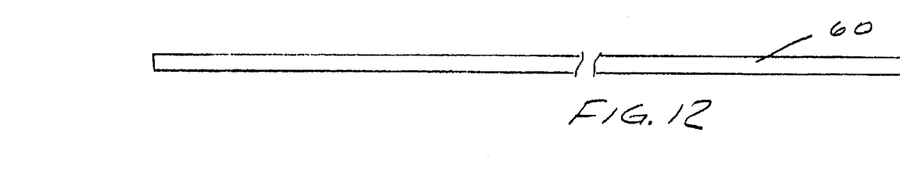
FIG. 12 is a plan view of one of the guide rods of the apparatus of FIG. 6.

One of the guide rods 60 is shown in FIG. 12. Each guide rod simply is an elongated solid shaft-like member having a round configuration in cross-section.

Figures 13, 14, 15, 16, 17, 18:
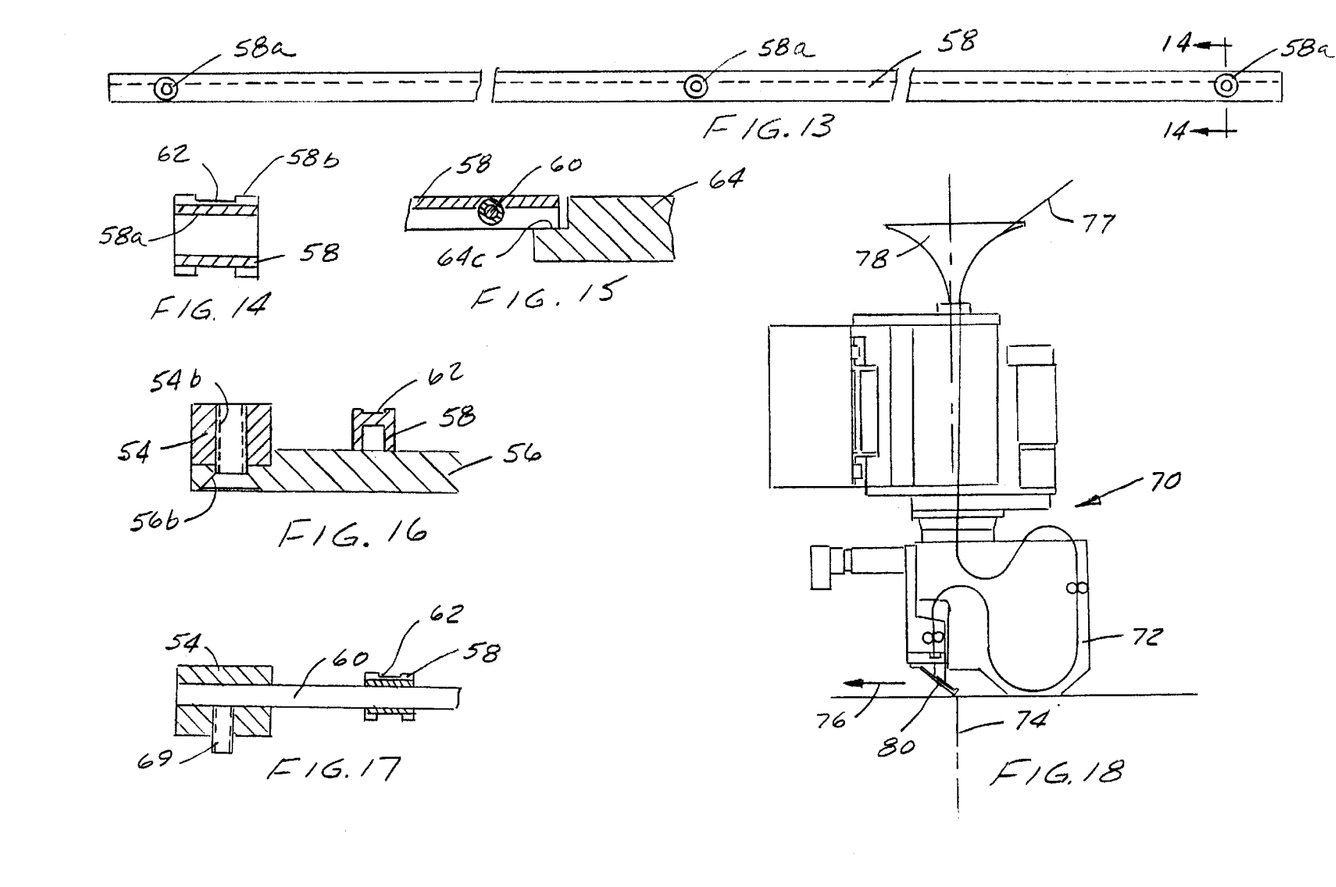
FIG. 13 is a side elevational view of one of the elongated ribbonizing plates of the apparatus of FIG. 6.
FIG. 14 is an enlarged vertical section taken generally along line 14—14 of FIG. 13.
FIG. 15 is an enlarged vertical section taken generally along line 15—15 of FIG. 6.
FIG. 16 is an enlarged vertical section taken generally along line 16—16 of FIG. 6.
FIG. 17 is an enlarged section taken generally along line 17—17 of FIG. 6.
FIG. 18 is an elevational view of a mechanical routing apparatus having a routing head.

One of the elongated ribbonizing plates 58 is shown in FIGS. 13 and 14. Each ribbonizing plate has three enlarged, horizontal through passages 58a for slidably mounting the ribbonizing plates on the three guide rods 60 shown in FIG. 6. A shallow, flat trough 62 is formed in a top surface 58b of each ribbonizing plate for gathering the individual fibers in ribbon form as described above in relation to FIG. 4. At least the trough is coated with Teflon material so that the ribbonized fibers can be easily stripped therefrom, again as described in relation to FIG. 4.

In assembly of universal ribbonizing apparatus 50A (FIG. 6), ribbonizing plates 58 are "threaded" onto guide rods 60, with the guide rods extending through passages 58a (FIG. 14) as seen in FIGS. 6 and 17. With the ribbonizing plates positioned onto the guide rods, the guide rods are inserted into through holes 54b (FIG. 9) in side frame components 54. Set screws 69 (FIG. 17) which are threaded through side frame components 54 then are used to hold or fix the guide rods to the side frame components, while ribbonizing plates 58 are free to move back and forth on the guide rods in the direction of double-headed arrow "A" (FIG. 6). The ends of side frame components 54 (FIG. 9) then are positioned into stepped opposite sides 64a of setup plate or platform 64 (FIG. 7) and are bolted thereto by fasteners positioned through holes 64b in the setup plate and holes 54c in the side frame components. The opposite stepped ends 56a of cross frame components 56 (FIGS. 10 and 11) then are secured to the undersides of side frame components 54 as seen in FIG. 16, with fastening bolts inserted through holes 56b in the cross frame components aligned with holes 54b in the side frame components. Ribbonizing plates 58 then can be adjusted to precisely align troughs 62 of the ribbonizing plates with the fibers of the input/output tails of the multi-layer backplane circuit.

The difference between universal ribbonizing apparatus 50A (FIG. 6) and ribbonizing apparatus 50 shown in FIG. 4, is that the universal apparatus has many (20) more ribbonizing plates 58 for use with a wide variety of backplane or optical circuit configurations having a considerable number of input and/or output tails. Ribbonizing apparatus 50 shown in FIG. 4 is a custom apparatus for the specific backplane or circuit used herein to exemplify the invention. Nevertheless, ribbonizing plates 58 of apparatus 50 (FIG. 4) can slide along guide rods 60 to precisely align troughs 62 with the loose fiber ends projecting from the substrates of the top and bottom layer circuits. In either embodiment, the juxtaposed top and bottom circuits are positioned as shown in FIG. 4, with substrate output fingers 24d (or input fingers 24c) resting on top of setup plate or platform 64 and abutting the ends of ribbonizing plates 58. The components are dimensioned so that the individual fibers of the input and output tails can be laid continuously from fingers 24d or 24c directly into troughs 62 of the ribbonizing plates, as the ribbonizing plates rest on top of cross frame components 56 and a front lip 64c of setup plate 64 as seen in FIGS. 15 and 16.

Individual optical fibers 26 are routed onto bottom layer substrate 24, and individual fibers 40 are routed onto top layer substrate 38 by a mechanical routing apparatus, generally designated 70 in FIG. 18, which includes a routing head 72. The apparatus including the routing head can pivot about an axis 74 as it moves in the direction of arrow 76. An individual optical fiber 77 is fed into a funnel 78 of the apparatus and is fed to a needle 80 which applies the fiber to substrates 24 and 38, whereby the fibers are held onto the substrates by the adhesive material on the substrates. The apparatus includes a cut-off mechanism as is known in the art. Further details of such a routing apparatus can be derived from co-pending application Ser. No. 09/645,624, filed Aug. 24, 2000, assigned the assignee of the present invention, and which is incorporated herein by reference.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A ribbonizing apparatus for gathering a plurality of individual optical fibers into ribbon form, comprising:
   a frame;
   a plurality of elongated generally coplanar ribbonizing plates, each plate being configured for receiving plurality of individual optical fibers and gathering the fibers into ribbon form of a plurality of ribbons in a common plane; and
   means mounting at least some of the ribbonizing plates on the frame for lateral movement relative to each other and relative to the frame in said plane to vary the positions of the plates relative to the frame when mounted on the frame.

2. The ribbonizing apparatus of claim 1 wherein each ribbonizing plate includes a shallow trough in a top face thereof.

3. The ribbonizing apparatus of claim 2 wherein at least one end of said troughs is open for laying the fibers thereinto.

4. The ribbonizing apparatus of claim 1 wherein said mounting means include at least one guide rod extending transversely through the ribbonizing plates and along which the ribbonizing plates are slidably movable.

5. The ribbonizing apparatus of claim 4 wherein said frame includes a pair of longitudinal side frame components between which said rod extends.

6. The ribbonizing apparatus of claim 5 wherein said frame includes at least one cross frame component on which the ribbonizing plates slidably rest.

7. The ribbonizing apparatus of claim 1 wherein said frame includes a plurality of longitudinal frame components joined by a plurality of cross frame components on which the ribbonizing plates slidably rest.

8. A ribbonizing apparatus for gathering into ribbon form a plurality of individual optical fiber tails emanating from a generally planar substrate, comprising:
   a frame;
   a generally planar setup platform on the frame for positioning said substrate; and
   a plurality of elongated generally coplanar ribbonizing plates extending away from the setup platform, each plate being configured for receiving a plurality of individual optical fibers and gathering the fibers into ribbon form.

9. The ribbonizing apparatus of claim 8, including means mounting at least some of the ribbonizing plates on the frame for lateral movement relative thereto to adjust the positions of the plates relative to the setup platform.

10. The ribbonizing apparatus of claim 9 wherein said mounting means include at least one guide rod extending transversely through the ribbonizing plates and along which the ribbonizing plates are slidably movable.

11. The ribbonizing apparatus of claim 8 wherein each ribbonizing plate includes a shallow trough in a top face thereof.

12. The ribbonizing apparatus of claim 11 wherein at least one end of said troughs is open for laying the fibers thereinto.

* * * * *